United States Patent
Quarrie

[11] Patent Number: 5,632,443
[45] Date of Patent: May 27, 1997

[54] AUXILIARY VEHICLE HEATER

[76] Inventor: Thomas J. Quarrie, 801 W. Sandusky St., Findlay, Ohio 45840

[21] Appl. No.: 662,087

[22] Filed: Jun. 12, 1996

[51] Int. Cl.⁶ .................................................. B60H 1/02
[52] U.S. Cl. ............................. 237/12.3 C; 431/168; 431/170
[58] Field of Search ........................ 237/12.3 C; 431/168, 431/170

[56] References Cited

U.S. PATENT DOCUMENTS

| | | |
|---|---|---|
| 1,387,799 | 8/1921 | Mills et al. |
| 1,552,086 | 9/1925 | Slocum. |
| 4,192,457 | 3/1980 | Easterly ............................. 237/12.3 |
| 4,548,575 | 10/1985 | Hirauchi ............................. 431/88 |
| 4,590,888 | 5/1986 | Mosig ............................. 122/149 |
| 4,640,262 | 2/1987 | Lucius ............................. 126/110 |
| 4,718,602 | 1/1988 | Beck et al. ............................. 237/32 |
| 5,046,663 | 9/1991 | Bittmann ............................. 237/12.3 |
| 5,063,513 | 11/1991 | Shank et al. ............................. 364/424.05 |
| 5,082,175 | 1/1992 | Koch et al. ............................. 237/12.3 |

Primary Examiner—Harold Joyce
Assistant Examiner—Derek S. Boles
Attorney, Agent, or Firm—Brinks Hofer Gilson & Lione

[57] ABSTRACT

An auxiliary vehicle heater includes a combustion air fan, an intermittently rotating, absorbent wick, a glow plug for initiating combustion and a water jacket surrounding a combustion chamber. Fuel is supplied to the rotating wick by a metering pump and the hot combustion gases enter the combustion chamber and give up heat to the vehicle coolant surrounding it in the water jacket. The coolant is then pumped to the heater core of the vehicle heater. A thermocouple in the exhaust passage of the combustion chamber senses the exhaust temperature and three thermostats in the water jacket provide temperature data to a microprocessor which controls operation of the heater in response to sensed conditions and operator commands.

8 Claims, 7 Drawing Sheets

AUXILIARY VEHICLE HEATER

BACKGROUND OF THE INVENTION

The invention generally relates to auxiliary vehicle heater for providing heat to the interior of the vehicle when the motor is not operating and more specifically to an auxiliary truck heater which utilizes vehicle fuel and heats the motor coolant so that heat may be extracted therefrom in the heater core of the vehicle's heater.

Large, long haul trucks present cabin heating difficulties. Although they are routinely equipped with cab heaters having heater cores through which the motor coolant circulates, this configuration addresses the issue of cabin heat only when the vehicle's motor is operating. The answers to two following questions quickly define the problem. The first question is: is cabin heat required when the vehicle is not moving. Very frequently, the answer is yes. The second question is: is the operation of the vehicle engine by any standard an efficient way to heat the cabin. The answer to this question is a uniform and acknowledged no.

In view of the foregoing, numerous products have been designed to address the need for auxiliary heat in motor vehicle cabs which do not require operation of the vehicle motor. Patents addressing such products are also known.

For example, U.S. Pat. No. 4,192,457 discloses an early auxiliary truck heater intended primarily to heat the vehicle engine and fuel line when the engine is not operating. In U.S. Pat. No. 4,718,602 an auxiliary vehicle heater is disclosed which includes a subassembly including a nozzle hose, a fuel pump, a filter and a solenoid valve. U.S. Pat. Nos. 5,046,663 and 5,082,175 also present various embodiments of auxiliary truck heaters.

Within the last several years, software available in programmable microprocessors has improved both the operation and safety of such devices. U.S. Pat. No. 5,063,513 discloses such a heater and control device wherein the controller may be programmed to commence operation at a preselected time in order to warm the vehicle passenger compartment appropriately and efficiently.

In review of these and other patents reveal the complexity of such devices and suggests that improvements in the art of auxiliary vehicle heaters are both possible and desirable.

SUMMARY OF THE INVENTION

An auxiliary vehicle includes a combustion air fan, an intermittently rotating, absorbent wick, a glow plug for initiating combustion and a water jacket surrounding a combustion chamber. Fuel is supplied to the rotating wick by a metering pump and the hot combustion gases enter the combustion chamber and give up heat to the vehicle coolant surrounding it in the water jacket. The coolant is then pumped to the heater core of the vehicle heater. A thermocouple in the exhaust passage of the combustion chamber senses the exhaust temperature and two thermistors in contact with the heated coolant exiting the water jacket provide temperature data to an electronic controller which controls operation of the heater in response to sensed conditions and operator commands.

It is thus an object of the present invention to provide an auxiliary vehicle heater which heats engine coolant to provide heat to the cab and engine of a motor vehicle.

It is a further object of the present invention to provide an auxiliary vehicle heater which utilizes diesel vehicle fuel.

It is a still further object of the present invention to provide an auxiliary vehicle heater wherein in a rotating wick and metering pump achieve controlled fuel combustion.

It is a still further object of the present invention to provide an auxiliary vehicle heater having a coolant pump which circulate heated engine coolant through the engine block and heater core of the vehicle's cab.

It is a still further object of the present invention to provide an auxiliary vehicle heater which is straightforward in design and construction and simple and safe to operate.

Further objects and advantages of the present invention will become apparent by reference to the following description of the preferred embodiment and appended drawings wherein like reference numbers refer to the same element, component or feature in the various drawing figures.

DESCRIPTION OF THE PREFERRED EMBODIMENT

Figure 1:
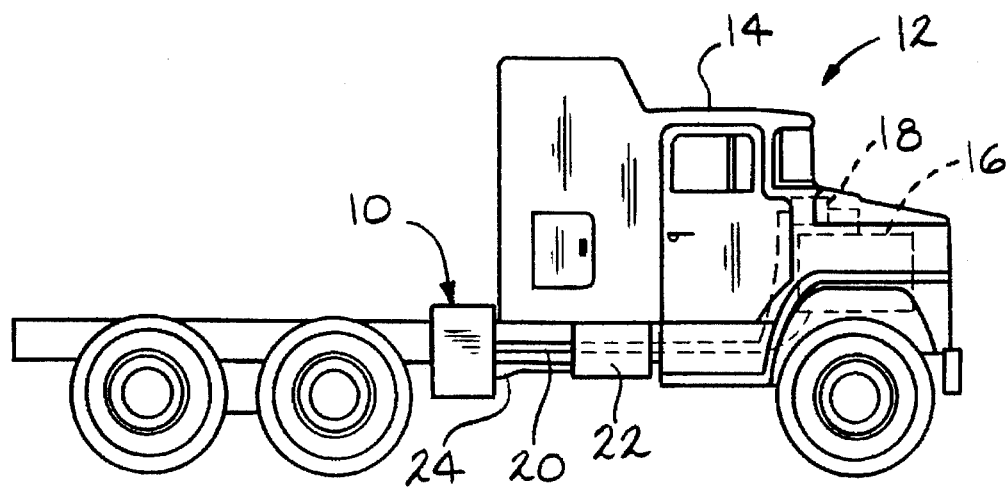
FIG. 1 is a side elevational view of a truck tractor equipped with an auxiliary vehicle heater according to the present invention.
Figure 5:
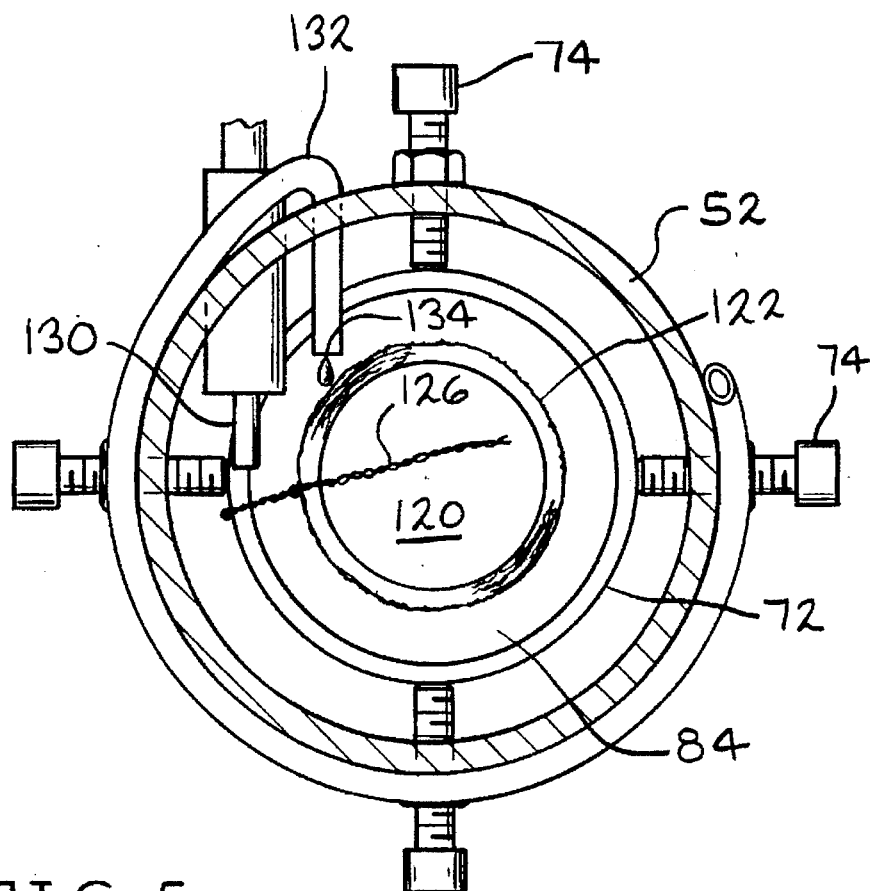
FIG. 5 is a full, sectional view of an auxiliary vehicle heater according to the present invention taken along line 5—5 of FIG. 3.

Referring now to FIG. 1, an auxiliary vehicle heater is illustrated and generally designated by reference number 10. The auxiliary vehicle heater 10 is preferably utilized with the tractor 12 of a semi-trailer truck but will find application in any, typically larger vehicle, in which idling the engine represents significant fuel consumption or which may be occupied overnight, for example, by sleeping occupants. The tractor 12 includes a cab 14 which may be a sleeper cab, as illustrated or any other configuration defining a closed interior space. Alternatively, the auxiliary vehicle heater may be utilized with any type of motor vehicle including a passenger car, pickup truck, off-road vehicle, military transport or the like having a defined interior driver and passenger compartment. Conventionally located within the truck 12 is an engine 16 and a heater core 18 which are in fluid communication through various hoses and tubing 20. The truck 12 also typically includes diesel fuel tanks 22, one of which is illustrated in FIG. 1 and which provides diesel fuel to the auxiliary heater 10 through a fuel line 24.

Figure 2:
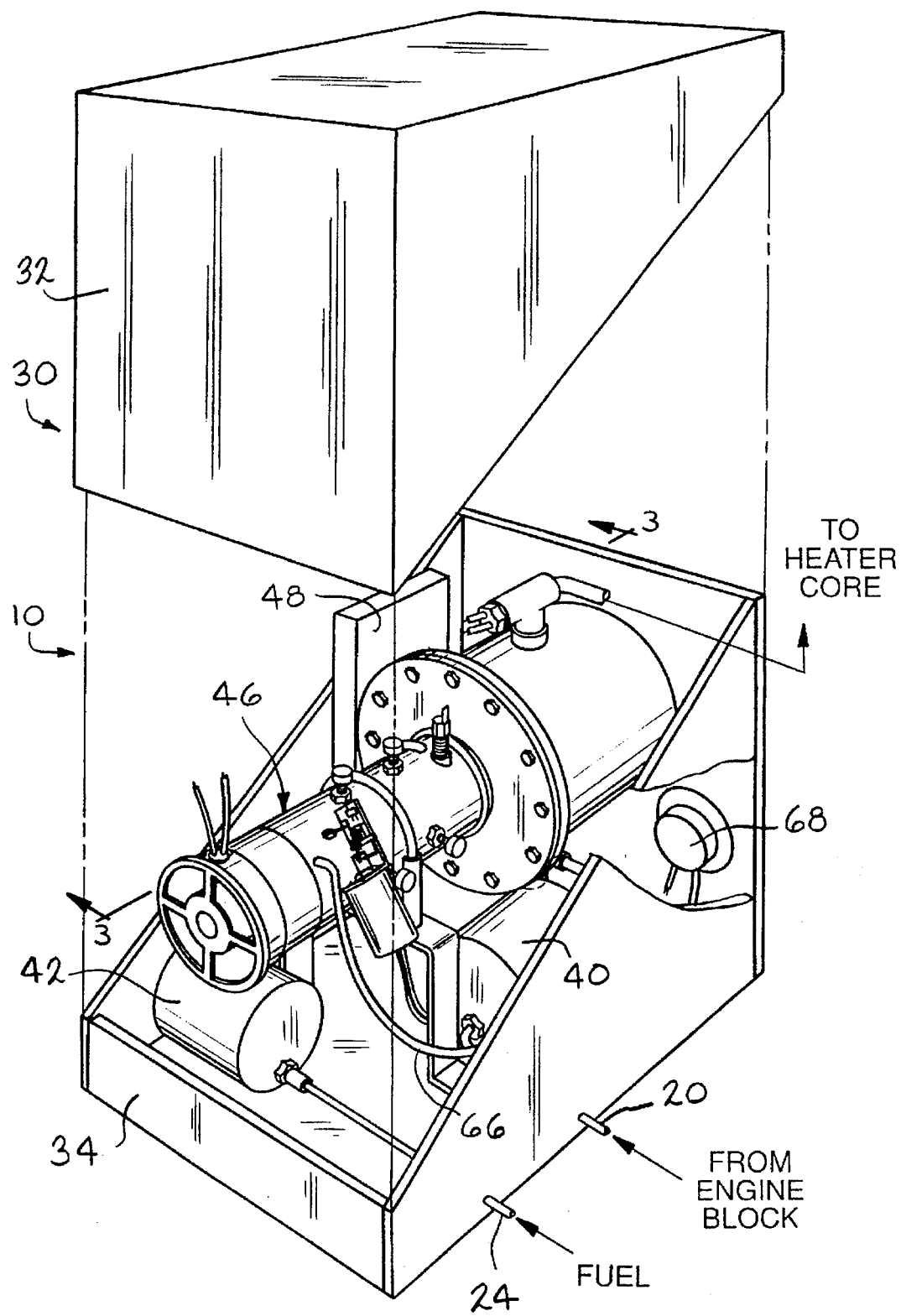
FIG. 2 is a perspective view of an auxiliary vehicle heater according to the present invention with the upper housing raised.

Turning now to FIG. 2, the auxiliary vehicle heater 10 is preferably housed in a two part rectangular housing 30 having a diagonal parting line which divides the housing 30 into an upper cover 32 and a lower mounting base 34. The upper cover 32 preferably seals relatively tightly against the bottom 34 to prevent the unwanted incursion of water and foreign particulate matter into the interior of the auxiliary heater 10 as will be readily appreciated. Preferably the housing 30 is fabricated of steel or aluminum plates and is sturdy enough to protect the internal components of the auxiliary heater 10 from road debris and unauthorized access. The auxiliary vehicle heater 10 includes a coolant pump 40 which receives engine coolant from the engine 16 in the hose or pipe 20 and provides it to a water jacket and combustion chamber assembly 44 disposed within the housing 30. Likewise, a fuel pump 42 receives fuel from the fuel tank 22 through the fuel line 24 and provides it to a burner assembly 46 which is coupled to the water jacket and combustion chamber assembly 44 and disposed within the housing 30. The fuel pump 42 is an intermittent, pulse device which may include a solenoid operated bellows which provides a specific, metered repeatable amount of fuel per spoke or impulse. The fuel pump 42 supplies fuel in 0.3 milliliter increments, i.e., 0.3 milliliters of fuel per pulse or activation. Electrical components such as an electronic controller 48 are housed and protected in a preferably sealed package.

Figure 3:
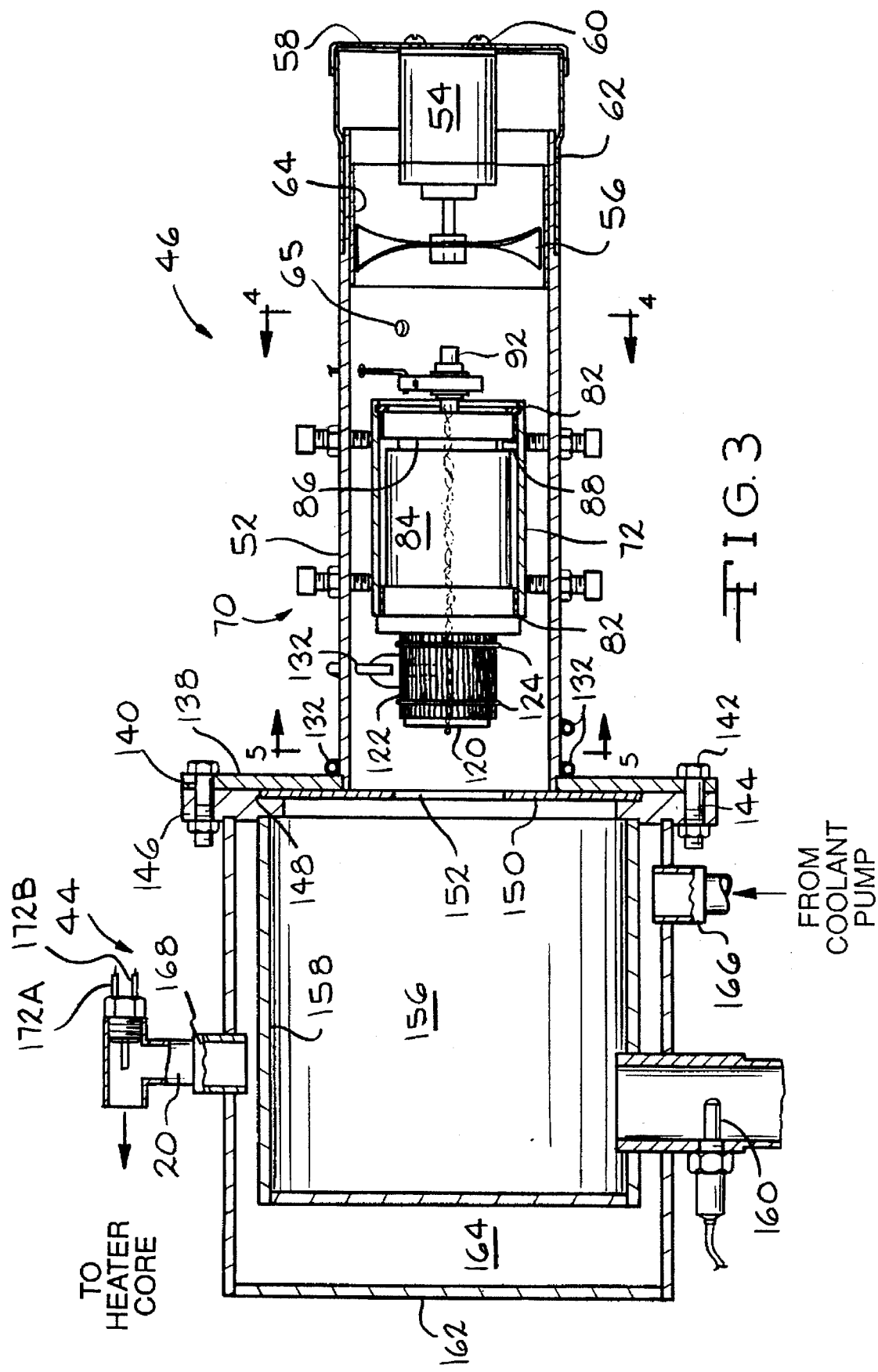
FIG. 3 is a full, sectional view of an auxiliary vehicle heater according to the present invention taken along 3—3 of FIG. 2.
Figure 4:
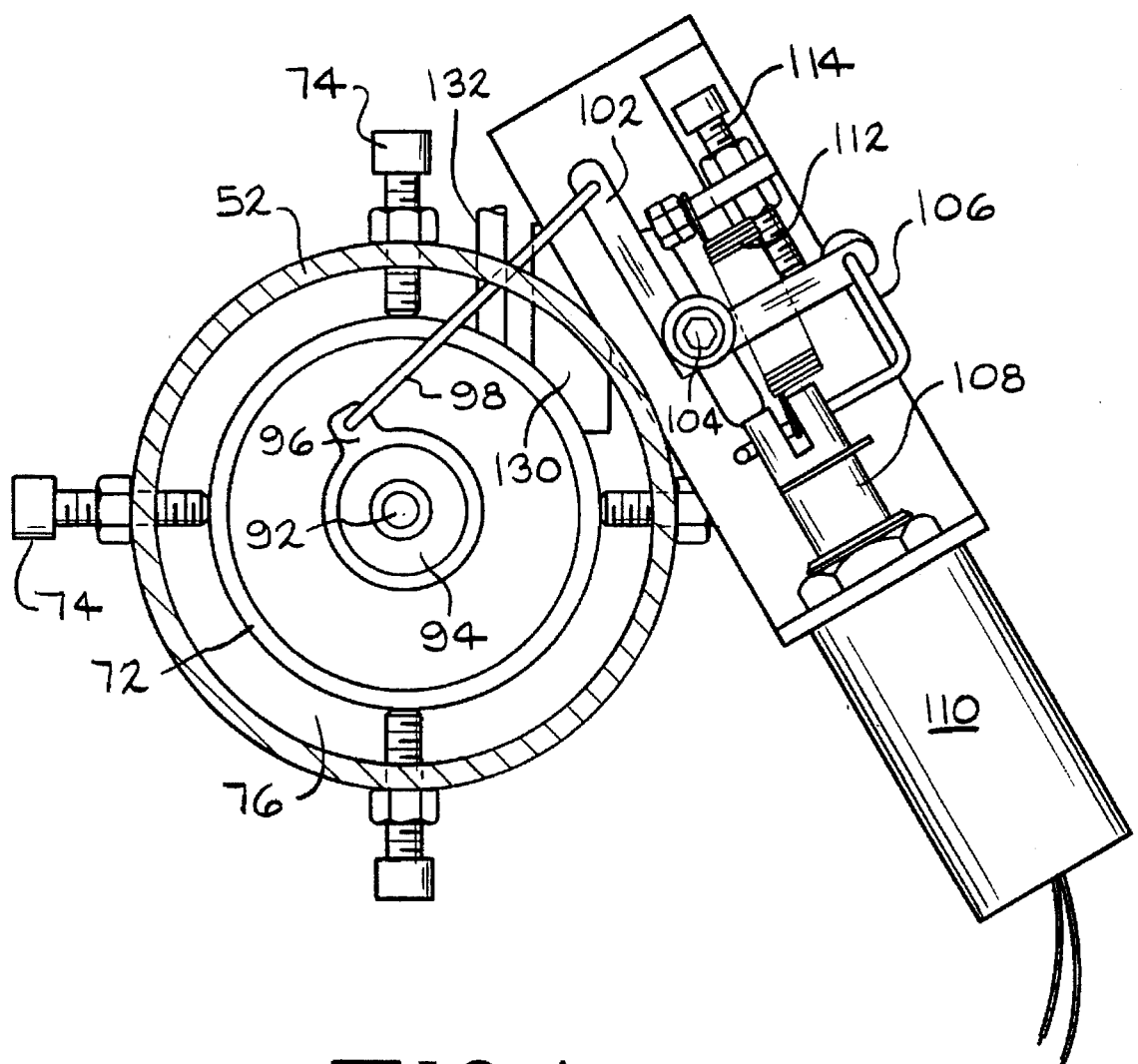
FIG. 4 is a full, sectional view of an auxiliary vehicle heater according to the present invention taken along line 4—4 of FIG. 3.

Referring now to FIGS. 2, 3 and 4, the burner assembly 46 includes an elongate cylindrical housing 52 which contains and supports various components of the burner assembly 46. At the end of the cylindrical housing 52 opposite the water jacket and combustion chamber assembly 44 is a fan motor 54 and axial blade fan 56. The motor 54 is secured to an end cap 58 by, for example, suitable fasteners 60 and the end cap 58 slides over and is secured to a reduced diameter portion 62 adjacent the end of the elongate cylindrical housing 52. In order to ensure the highest efficiency of the axial blade fan 56, the clearance between the tips of the blades of the fan 56 and the interior of the elongate cylindrical housing 52 may be reduced by a cylindrical insert or shroud 64, if necessary. Alternatively, the interior diameter of the elongate cylindrical housing 52 may include an integrally formed reduced diameter region. In any event, it should be understood that best performance of the heater 10 will be achieved when the clearance between the blade tips of the axial fan 56 and adjacent region of the cylindrical housing 52, the shroud 64 or similar structure is an absolute minimum. It will be appreciated that the blades of the axial fan 56 draw air into the end of the elongate cylindrical housing 52 and drive it toward the water jacket and combustion chamber assembly 44.

Slightly downstream of the axial fan 56 and formed in the sidewall of the cylindrical housing 52 is a pressure port 65. The pressure port 65 permits sampling of the pressure within the cylindrical housing 52 as will be readily appreciated. A flexible tube or hose 66 provides communication between the pressure port 65 and a two position pressure sensor or switch 68. The pressure switch 68 is set to switch between states at approximately 0.1 inches of water column pressure.

Also disposed in the cylindrical housing 52, down stream of the fan 56 and the port 65, is a fuel wick assembly 70. The fuel wick assembly 70 includes a cylindrical housing 72 which is centered and fixed within the elongate cylindrical housing 52 by a plurality of stanchions, studs or threaded fasteners 74. It should be appreciated that alternative mounting schemes which suitably support and fix the cylindrical housing 72 as well as provide and permit adjustment to provide a uniform annular air passageway 76 about the cylindrical housing 72 are acceptable alternatives to the configuration illustrated. The cylindrical housing 72 includes at least a pair of auxiliary spaced apart annular teflon impregnated bearings 82 which rotatably support a drive cylinder 84. The drive cylinder 84 is axially restrained and retained within the cylindrical housing 72 by a cooperating circumferential groove 86 in the drive cylinder 84 and pin 88 extending radially inwardly from the wall of the cylindrical housing 72. At one end of the drive cylinder 84 is disposed an axially extending shaft 92. A one-way or overrunning clutch 94 is positively secured to the shaft 92 and a collar 96 about the overrunning clutch 94 receives one end of a drive link 98. The other end of the drive link 98 is connected to one arm of a bell crank 102. The bell crank 102 is pivoted upon a suitable pivot pin 104 which is disposed parallel to the axis of the shaft 92. The other arm of the bell crank 102 receives a link 106 having its other end coupled to a plunger 108 of a solenoid 110. A tension spring 112 extends between the link 106 and the plunger 108 of the solenoid 110 and a stationary pin 112 and acts to return the plunger 108 of the solenoid 110 to the position illustrated in FIG. 4. A threaded adjustment screw 114 and lock nut facilitates adjustment of the extent of rotation of the bell crank 102 and thus the rotation of the drive cylinder 84 as will be readily appreciated.

Activation of the solenoid 110 draws the plunger 108 downwardly as illustrated in FIG. 4, rotates the bell crank 102 in a clockwise direction about the pivot 104, draws the link 98 up and to the left as illustrated in FIG. 4 and rotates the shaft 92 and cylinder 84 several degrees in the clockwise direction. When the solenoid 110 is relaxed, the opposite motion of the links 106, the bell crank 102 and link 98 occur but the overrunning clutch 94 uncouples and allows such return or reverse motion without driving the shaft 92 and cylinder 84 in the reverse direction. Thus, repeated activation of the solenoid 110 rotates the cylinder 84 clockwise in small, repeated angular increments.

At the opposite end of the cylinder 84 from the overrunning clutch 94 and associated linkage is a stub cylinder 120. Disposed about the peripheral circumferential surface of the stub cylinder 120 is a fiberglass wick 122 which is retained by circumferential rings or clips 124. The fiberglass wick 122 preferably consists of several layers of a woven fiberglass material having a width substantially equal to the axial length of the cylindrical stub 120 and which is wrapped around the cylindrical stub 120 and secured there by the clips 124. Attached to and extending from the cylindrical housing 72 is a cleaning or scraping arm 126 which conforms generally to the exterior profile of the cylinder 84, the cylindrical stub 120 and with the wick 122 disposed thereon. The scraping arm is preferably fabricated of nickel-chrome wire or other metal having good high temperature stability and strength. That is, the scraping arm 126 extends radially inwardly along the end face of the cylinder 84, axially along and spaced a small radial distance from the wick 122 and then turns a right angle and conforms generally to the end surface of the cylindrical stub 120. As the cylinder 84 and the wick 122 are incrementally rotated, the scraping arm 126 removes any buildup of carbon or other deposits on the wick 122. It should be appreciated that best performance of the heater 10 has been found with the scraping arm 126 disposed circumferentially and radially as illustrated relative to the associated components.

Lastly, the burner assembly 46 include a glow plug 130 which is mounted through a suitable opening in the elongate cylindrical housing 52 and is disposed generally medially along the axial length of the wick 122 a small radial distance therefrom. Current designs utilize a spacing of approximately 3/16 of an inch (between 4 and 5 mm). Disposed proximate the glow plug 130 is a fuel supply line 132 which is also positioned axially medially along the length of the wick 122 and generally between the glow plug 130 and the wick 122. The fuel line 132 terminates in a small orifice 134 which permits the fuel to fall by gravity onto the wick 122. In order that the air moving through the passageway 76 not disrupt such flow of fuel onto the wick 122, the fuel line 132 should terminate proximate the wick 122 and in any event within the protected region defined by the step in diameters between the larger cylinder 84 and the stub cylinder 120. The fuel line 132 preferably circles the end of the elongate cylindrical housing 52 adjacent the water jacket and combustion chamber assembly 44 between about one and one-half times. This configuration preheats the diesel fuel during operation and improves its combustion characteristics.

The cylindrical housing 72 is terminated at its end adjacent the water jacket and combustion chamber assembly 44 with a flange 138 having a plurality of circumferentially spaced apart apertures 140 which receive a like plurality of complementarily configured threaded fasteners 142. The threaded fasteners 142 extend through a like plurality of complementarily configured apertures 144 disposed in a like sized flange 146 which forms a portion of the water jacket and combustion chamber assembly 44. A circular stepped region or counter bore 148 formed in the face of the flange 146 receives a circular plate 150 having an orifice 152 centrally disposed therein. The orifice 152 controls the flow of air partially burned fuel and flame into a combustion chamber 156. As such its diameter is somewhat critical. Given a diameter of the cylindrical housing 72 of between about 3 and 4 inches (76.2 mm to 101.6 mm) the diameter of the orifice 152 will typically be in the range of from 1.5 inches to 1.75 inches (38.1 mm to 44.5 mm).

The combustion chamber 156 is cylindrical and is defined by a cylindrical housing 158 which provides a sealed interior volume having an inlet defined by the orifice 152 and an outlet defined by an exhaust tube 160. The exhaust tube 160 extends from the inside of the cylindrical housing 158, that is, within the combustion chamber 156 and communicates with the ambient. The cylindrical chamber 158 is fully and sealingly surrounded by a water jacket housing 162. The water jacket housing 162 is complementarily to but larger than the combustion chamber housing 158 and defines a sealed region or water jacket 164 thereabout having an inlet fitting 166 which receives engine coolant from the pump 40 and an outlet tee fitting 168 which is coupled to and provides engine coolant to the heater core 18 through one of the lines 20. Mounted in one passageway of the outlet tee fitting 168 are two thermistors 172A and 172B. The output of the first thermistor 172A is provided to the electronic controller 48 and limits fuel flow to the burner when coolant temperature exceeds 170° F. (77° C.). The output of the second thermistor 172B is also provided to the electronic controller 48. When the temperature of the coolant exceeds 190° F. (88° C.), the thermistor 172B, through the electronic controller 48, causes the fuel pump 42 to be rendered inoperative until such time as the temperature of the coolant drops below 190° F. (88° C.).

Positioned in the exhaust tube 160 is a thermocouple 176 which monitors and reads the nominal temperature of the exhaust gases exiting the combustion chamber 156. The temperature sensed by the thermocouple 176 is converted into a millivolt electrical signal which is utilized by the electronic controller 48 or other control disposed in the sealed package to control operation of the auxiliary vehicle heater 10.

Figure 6A:
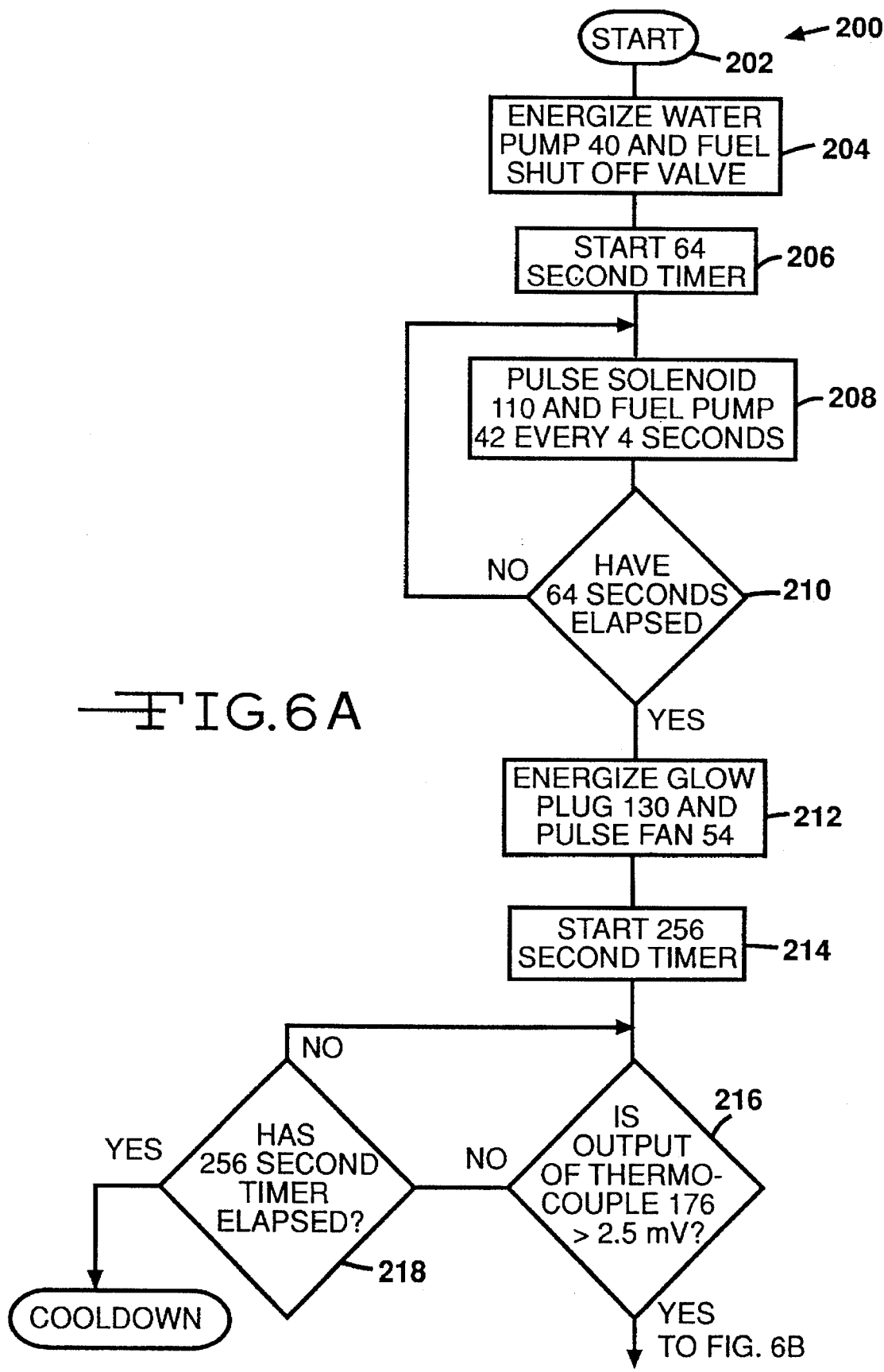
FIGS. 6A, 6B and 6C are flow diagrams setting forth the operational sequence and steps performed by an electronic controller according to the present invention.
Figure 6B:
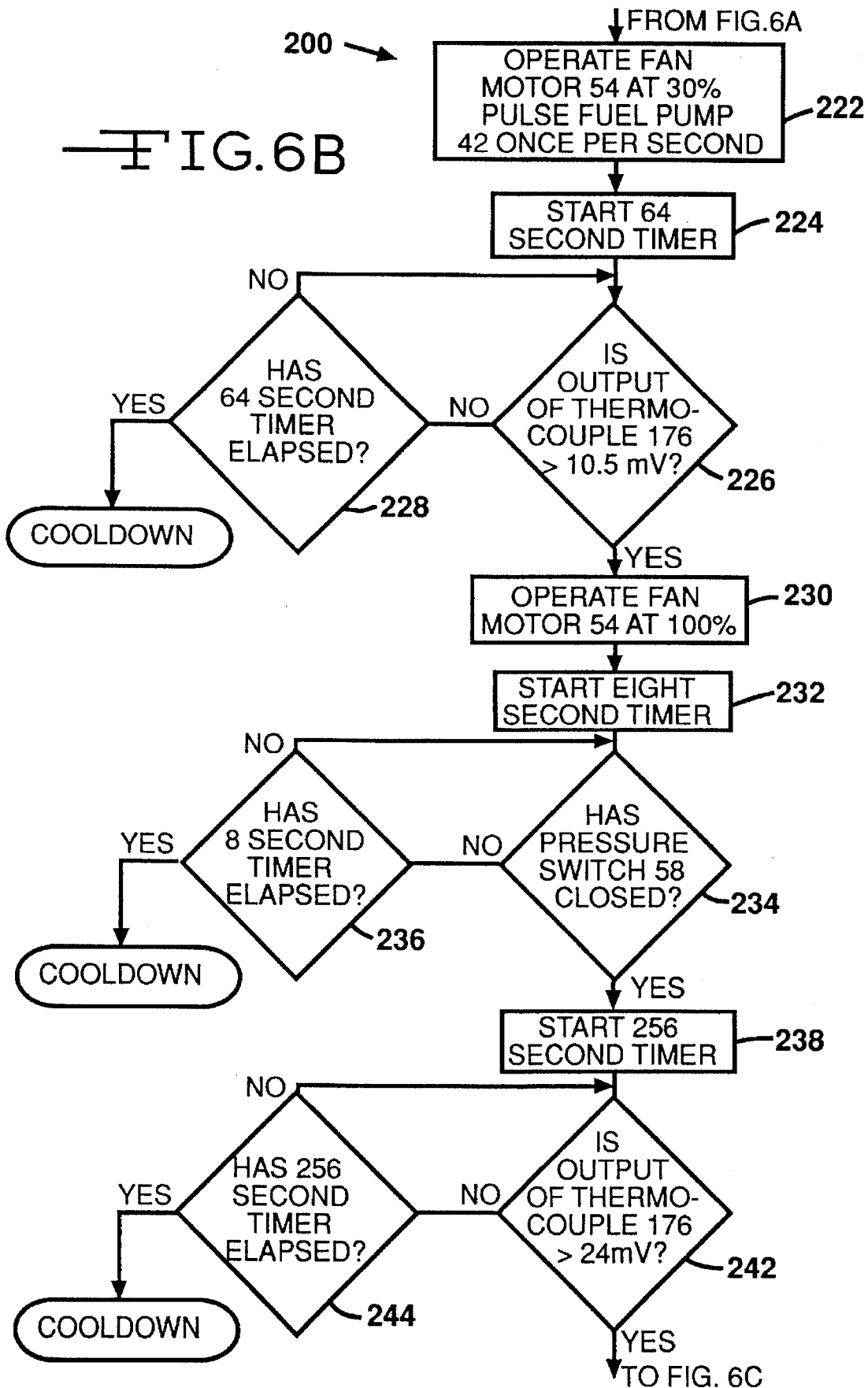
Figure 6C:
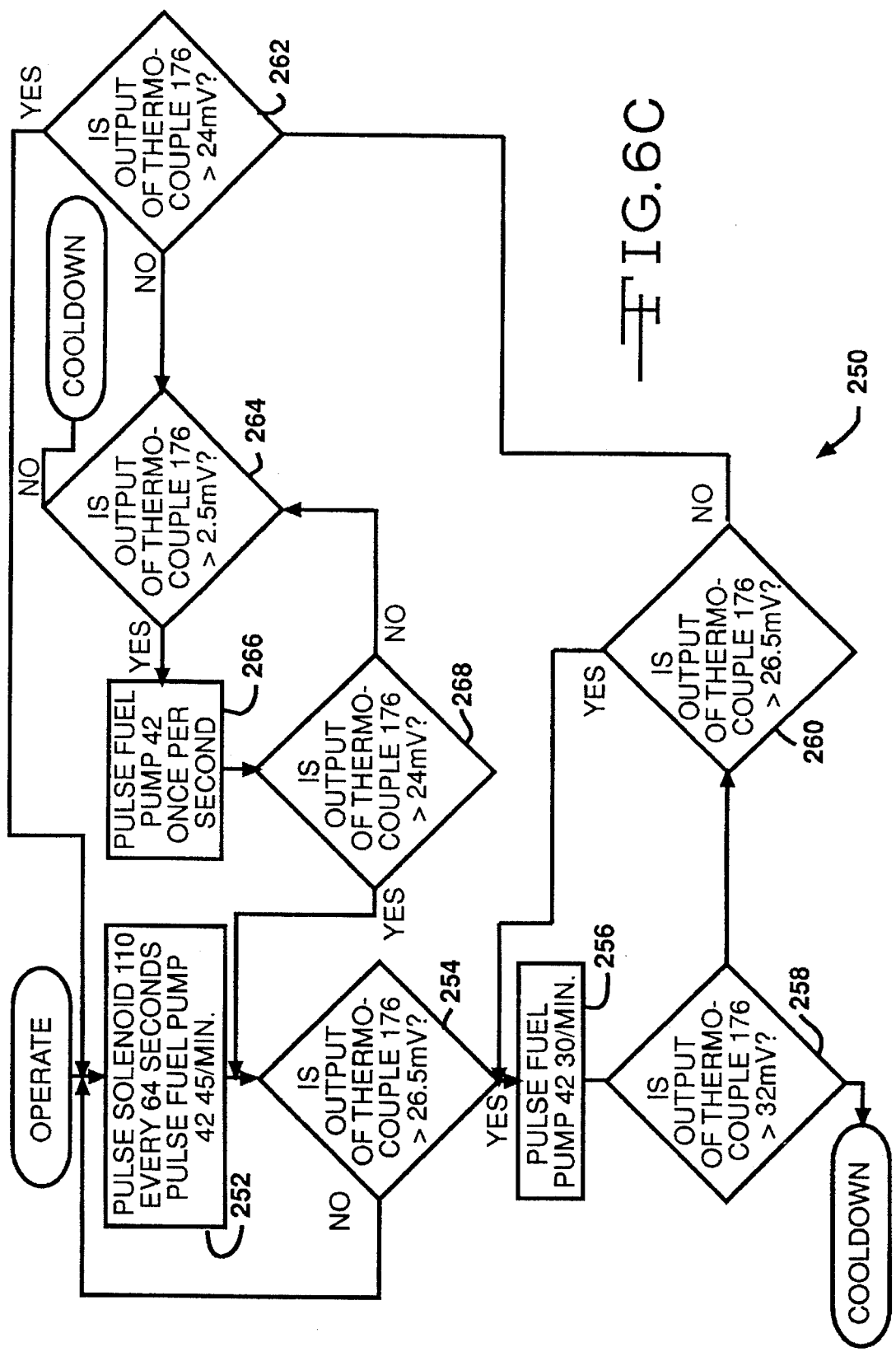

With reference now to FIGS. 6A, 6B and 6C as well as the other drawing figures, the operation of the auxiliary vehicle heater 10 will be described. As noted, the operation is controlled by and under the command of the electronic controller 48 which receives inputs from the various sensors such as the pressure switch 68, the thermistors 172A, 172B and the thermocouple 176 and provides various control signals and operating voltages to, for example, the fuel pump 42, the fan motor 54, the wick solenoid 110 and the glow plug 130 to achieve proper operation. Such operation is contained in the flow diagrams of FIGS. 6A, 6B and 6C and is generally designated by the reference numeral 200. When a dashboard mounted control switch (not illustrated) is turned on, the program 200 starts at step 202 and immediately moves to a process step 204 which activates the water pump 42 and a positive, two position fuel shut-off valve (not illustrated) which allows fuel to flow to the pulse fuel pump 42. Next a process step 206 is entered which begins a sixty-four second timer. Then a process step 208 pulses the fuel pump 42 and the wick solenoid 110 once every four seconds. Next, the decision point 210 determines whether the sixty-four second timer of process step 206 has elapsed. If it hasn't, the process step 208 repeats itself. If it has, and the fuel pump 42 and wick solenoid 110 have cycled sixteen times, the decision point 210 is exited at YES and the program 200 moves to a process step 212 which energizes the glow plug 130 and pulses the fan 54 at a rate of 0.25 seconds on, 0.75 seconds off. In the process step 214, a two hundred fifty-six second timer is started.

Next the program 200 moves to a decision point 216 which determines whether the output of the thermocouple 176 is greater than 2.5 millivolts. If the response to this query is no, a decision point 218 is entered which determines whether the two hundred fifty-six second clock of process step 214 has elapsed. If it has, the program moves to a default cool down step which will be discussed below. If the timer has not elapsed, the program returns to the input of the decision point 216. If the output of the thermocouple presently exceeds 2.5 millivolts, the decision point 216 is exited at YES and the program 200 enters a process step 222 which commences operation of the fan 54 full time at approximately 30 percent of maximum flow. Also at this time, the fuel pump 42 is pulsed at one pulse per second. Next, a process step 224 is entered which starts a sixty-four second timer operating.

The program 200 then moves to a decision point 226 which determines whether the output of the thermocouple 176 is greater than 10.5 millivolts. If it is not, the decision point 226 is exited at NO and a decision point 228 is entered which determines whether the 64 second timer of process step 224 has timed out. If it has not, the program 200 returns to the input of the decision point 226. If the timer has completed its sixty-four second count, the routine 200 defaults to the cool down cycle. If the decision point 228 is exited at YES, the program moves to a process step 230 which begins fan operation at 100 percent. Next, a process step 232 commences operation of an eight second timer and the program 200 then moves to a decision point 234 which determines whether the air pressure switch 68 has closed, indicating that the pressure within the cylindrical housing 46 has exceeded 0.1 inches of water column. If the switch is not closed, the decision point 234 is exited at NO and moves to a decision point 236 which determines whether the eight second clock of process step 232 has timed out. If it has, the program 200 defaults to the cool down cycle. If it has not, the decision point 236 exits at NO and returns to the input of the decision point 234. If the fan switch 68 has closed, the decision point 234 is exited at YES and the program 200 enter a process step 238 which starts a two hundred fifty-six second clock counting. A decision point 242 is then entered which determines whether the output of the thermocouple 176 is greater than 24 millivolts. If it is not, the decision point 242 is exited at NO and a decision point 244 is entered which determines whether the two hundred fifty-six second clock has completed its count. If it has, the decision point 244 is exited at YES and the program faults to the cool down cycle. If the 256 second clock of process step 238 has not expired, the decision point 244 is exited at NO, returning to the input of the decision point 242. If the output of the thermocouple 176 is greater than 24 millivolts, the start up cycle is complete and moves to the operating cycle illustrated in FIG. 6c.

In the operating phase 250 of the program 200, a first process step 252 is entered which pulses the fuel pump 42 at a rate of 45 cycles per minute. Furthermore, the wick solenoid 110 is pulsed once every 64 seconds. From the process step 252, a decision point 254 is entered which determines whether the output of the thermocouple 176 is greater than 26.5 millivolts. If it is not, the decision point 254 is exited at NO and returns to the input of the process step 252. If the output of the thermocouple 176 is greater than 26.5 millivolts, the decision point 254 is exited at YES and the program moves to a process step 256 which reduces the pulse rate of the fuel pump to 30 pulses per minute. Next, a decision point 258 is entered which determines whether the output of the thermocouple 176 is greater than 32 millivolts. If it is, the decision point 258 is exited at YES and the cool down cycle is commenced. If the output is below 32 millivolts, the decision point 258 is exited at NO and the program enters a decision point 260 which determines whether the output of the thermocouple is greater than 26.5 millivolts.

If it is, the decision point 260 is exited at YES and the program returns to the input of the process step 256. If the output of the thermocouple 176 is less than 26.5 millivolts, the decision point 260 is exited at NO and a decision point 262 is entered which determines whether the output of the thermocouple is greater than 24 millivolts. If it is, the decision point 262 is exited at YES and the program 200 returns to the input of the process step 252. If the output of the thermocouple 176 is not greater than 24 millivolts, the decision point 262 is exited at NO and a decision point 264 is entered which determines whether the output of the thermocouple 176 is greater than 2.5 millivolts. If it is not, the decision point 264 is exited at NO and the program defaults to the cool down cycle.

If the answer to the inquiry of decision point 264 is affirmative, the program 200 moves to a process step 266 which commences pulsing of the fuel pump 42 at one pulse per second. The process 266 is followed by a decision point 268 which determines whether the output of thermocouple is greater than 24 millivolts. If it is not, the decision point 268 is exited at NO and the program returns to the decision point 264. If the output of the thermocouple 176 is greater than 24 millivolts, a decision point 268 is exited at YES and the program 200 returns to the input of decision point 254.

The default or cool down cycle occupies two hundred fifty-six seconds and during this time, the fuel pump 42 cannot be pulsed, the glow plug 130 cannot be activated, the fan motor 54 will remain on high, the water pump 40 will continue to operate and the fuel shut off valve will continue to be energized. At the conclusion of the two hundred fifty-six seconds, if the on/off switch in the cab of the vehicle remains on, the heater 10 will once again commence operation at step 202 of the program 200. A second shutdown however, will terminate operation of the heater. Furthermore, at any time during operation if the operating switch is shut off, the heater 10 and program 200 immediately will default to the above noted cool down cycle and then fully shut off. Furthermore, if the thermistor 172B senses that the outlet coolant temperature is greater than 190° F. (88° C.), the fuel pump 42 will be deenergized until such time as the coolant temperature drops below 190° F. Finally, built in sensors in the controller 48 determine if the battery supply voltage exceeds 13.2 volts d.c. If it does, the controller 48 automatically commands the cool down cycle as explained above.

The foregoing disclosure is the best mode devised by the inventor for practicing this invention. It is apparent, however, that apparatus and methods incorporating modifications and variations will be obvious to one skilled in the art of diesel fuel heaters. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An auxiliary vehicle heater comprising, in combination, an elongate housing, a fan for moving air through said housing, a burner assembly disposed in said housing and having a wick, a driver for rotating said wick, means for supplying fuel to said wick, a combustion chamber having a heat exchanger for providing combustion heat to engine coolant, and an orifice disposed between said burner assembly and said combustion chamber.

2. The auxiliary vehicle heater of claim 1 further including a glow plug disposed adjacent said fuel line and said wick.

3. The auxiliary vehicle heater of claim 1 wherein said wick defines a cylinder having an axis and said wick is incrementally rotated on said axis by said driver.

4. The auxiliary vehicle heater of claim 1 wherein said driver includes a solenoid and a bell crank.

5. The auxiliary vehicle heater of claim 1 wherein said wick is disposed on a cylindrical body having an axis and said driver drives said body through an overrunning clutch.

6. The auxiliary vehicle heater of claim 1 wherein said fuel line is wrapped about said elongate housing.

7. The auxiliary vehicle heater of claim 1 wherein said heat exchanger defines a water jacket disposed about said combustion chamber.

8. The auxiliary vehicle heater of claim 1 wherein said combustion chamber includes an exhaust tube and further including a thermocouple disposed in said exhaust tube.

* * * * *